(12) United States Patent  (10) Patent No.: US 7,652,724 B2
Fukano  (45) Date of Patent: Jan. 26, 2010

(54) IMAGE DISPLAY APPARATUS HAVING SPEAKERS INCORPORATED INTO CABINET

(75) Inventor: Masaki Fukano, Tokyo (JP)

(73) Assignee: Sony Corporation, Tokyo (JP)

( * ) Notice: Subject to any disclaimer, the term of this patent is extended or adjusted under 35 U.S.C. 154(b) by 709 days.

(21) Appl. No.: 11/349,253

(22) Filed: Feb. 8, 2006

(65) Prior Publication Data

US 2006/0187364 A1 Aug. 24, 2006

(30) Foreign Application Priority Data

Feb. 24, 2005 (JP) ............................ P2005-048156

(51) Int. Cl.
*H04N 5/64* (2006.01)
*H04R 5/02* (2006.01)
(52) U.S. Cl. ...................... 348/836; 381/160
(58) Field of Classification Search ........................ None
See application file for complete search history.

(56) References Cited

U.S. PATENT DOCUMENTS

| 4,860,363 A | * | 8/1989 | Suzuki et al. ................. 381/89 |
| 5,274,709 A | * | 12/1993 | Koizumi ..................... 381/306 |
| 5,452,025 A | * | 9/1995 | Koizumi ..................... 348/805 |
| 5,675,131 A | * | 10/1997 | Saito et al. .................. 181/152 |
| 5,943,430 A | * | 8/1999 | Saitoh ........................ 381/160 |
| 6,005,642 A | * | 12/1999 | Meisner et al. ............. 348/838 |
| 7,142,683 B1 | * | 11/2006 | Markow et al. ............. 381/333 |
| 2006/0008103 A1 | * | 1/2006 | Takahashi et al. ........... 381/333 |

FOREIGN PATENT DOCUMENTS

| JP | 05-075955 | 3/1993 |
| JP | 06-197293 | 7/1994 |
| JP | 08-098113 | 4/1996 |
| JP | 08-214234 | 8/1996 |
| JP | 2000-209526 | 7/2000 |
| JP | 2004-056768 | 2/2004 |
| JP | 2004-242150 | 8/2004 |

\* cited by examiner

*Primary Examiner*—Paulos M Natnael
(74) *Attorney, Agent, or Firm*—Finnegan, Henderson, Farabow, Garrett & Dunner, LLP

(57) ABSTRACT

There is provided electronic equipment which includes: a cabinet; an image display apparatus incorporated into the cabinet; and speakers incorporated into the cabinet, in which the image display apparatus is disposed with an image display surface thereof facing a front of the cabinet, the speakers are disposed with sound radiating surfaces thereof inclined as viewed from the front of the cabinet, and a sound reflecting surface for reflecting sounds radiated from the speakers frontward is disposed in the cabinet.

16 Claims, 13 Drawing Sheets

IMAGE DISPLAY APPARATUS HAVING SPEAKERS INCORPORATED INTO CABINET

CROSS REFERENCES TO RELATED APPLICATIONS

The present document contains subject matter related to Japanese Patent Application JP 2005-048156 filed in the Japanese Patent Office on Feb. 24, 2005, the entire contents of which being incorporated herein by reference.

BACKGROUND OF THE INVENTION

1. Field of the Invention

The present invention relates to electronic equipment having an image display apparatus and speakers.

2. Description of Related Art

In small electronic equipment, such as a monitor apparatus for personal computers, in which an image display apparatus for displaying images and speakers for radiating sounds are incorporated into a cabinet, the speakers are often disposed, within the front of the cabinet, outside the left and right sides of or outside the lower side of an image display screen of the image display apparatus. However, in large electronic equipment, such as a television apparatus having an image display screen of a large area, speakers are also large, and when the speakers are disposed above, below, or on the left and right sides of the image display screen, the speakers occupy large spaces, increasing the height as viewed in an up-down direction and the width as viewed in a left-right direction of the electronic equipment. Thus, this configuration is disadvantageous in making the electronic equipment smaller in size (see Japanese Patent Application Publication No. 8-214234).

Moreover, as disclosed in Japanese Patent Application Publication No. 2004-056768, when the height of the electronic equipment as viewed in the up-down direction is increased with respect to the depth thereof as viewed in a front-rear direction, the center of gravity of the electronic equipment is located at a high position. In this case, in order to prevent the electronic equipment from falling down and keep it stable at the time of its installation, a pedestal or stabilizing support is typically provided, which projects frontward from the front edge of the bottom of the cabinet.

As mentioned above, the electronic equipment of the related art require a space as large as the outline of each speaker, in addition to a space occupied by the image display screen, at the front of the cabinet. This makes it disadvantageous in reducing the height as viewed in the up-down direction or the width as viewed in the left-right direction of the cabinet. Moreover, since the pedestal must be provided in order to keep the electronic equipment stable at the time of its installation, it not only is costly but also disadvantageous in ensuring a degree of freedom in design.

SUMMARY OF THE INVENTION

The present invention has been made in view of such circumstances, and there is provided electronic equipment which is advantageous in miniaturizing and ensuring a degree of freedom in design of, the electronic equipment.

Electronic equipment of an embodiment of the present invention includes a cabinet, an image display apparatus incorporated into the cabinet, and speakers incorporated into the cabinet. The image display apparatus is disposed with an image display surface thereof oriented toward a front of the cabinet. The speakers are disposed with sound radiating surfaces thereof inclined with respect to the front of the cabinet. A sound reflecting surface for reflecting sounds radiated from the speakers toward the front of the cabinet is provided in the cabinet.

According to the embodiment of the present invention, the speakers are disposed with their sound radiating surfaces inclined with respect to the front of the cabinet, and the cabinet is provided with the sound reflecting surface for reflecting sounds radiated from the speakers toward the front of the cabinet. As a result, in a case where the cabinet is viewed from the front, the dimensions of the outline of the front surface of each speaker can be greatly reduced, which is advantageous in miniaturizing the electronic equipment.

Moreover, even when the speakers are disposed below or above the image display surface, according to the embodiment of the present invention, the height of the electronic equipment as viewed in the up-down direction is decreased so that it is possible to dispense with the pedestal, resulting in implementing a cost reduction and ensuring a large degree of freedom in design.

DESCRIPTION OF THE PREFERRED EMBODIMENTS

An embodiment of electronic equipment according to the present invention will be described below in detail with reference to the drawings. In the present embodiment, a case where the electronic equipment is a projection television apparatus will be described.

Figure 1:
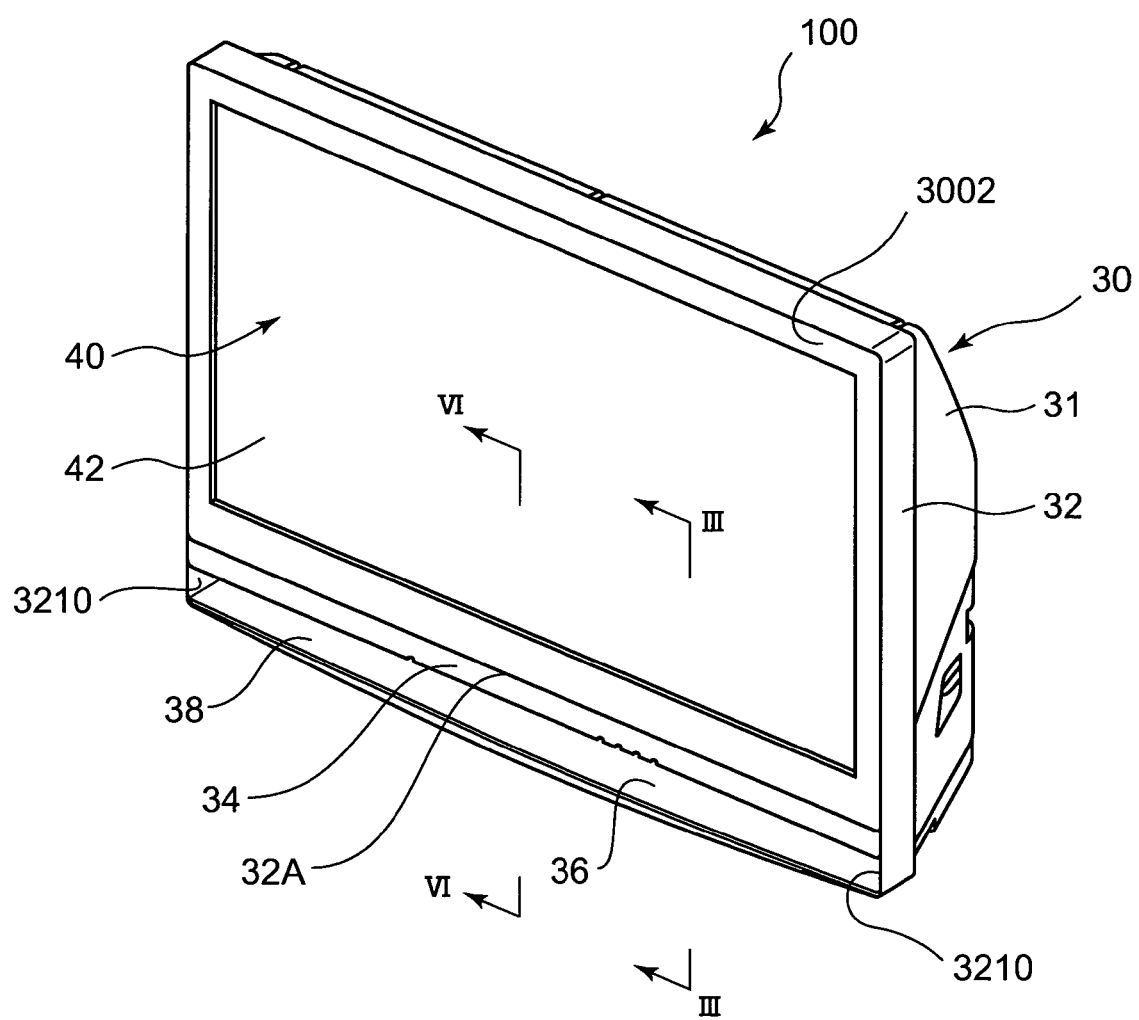
FIG. 1 is a perspective view of a projection television apparatus 100.

First, the configuration of a projection television apparatus 100 will be described. FIG. 1 is a perspective view of the projection television apparatus 100, and FIG. 2 is an exploded perspective view of the projection television apparatus 100.

Figure 2:
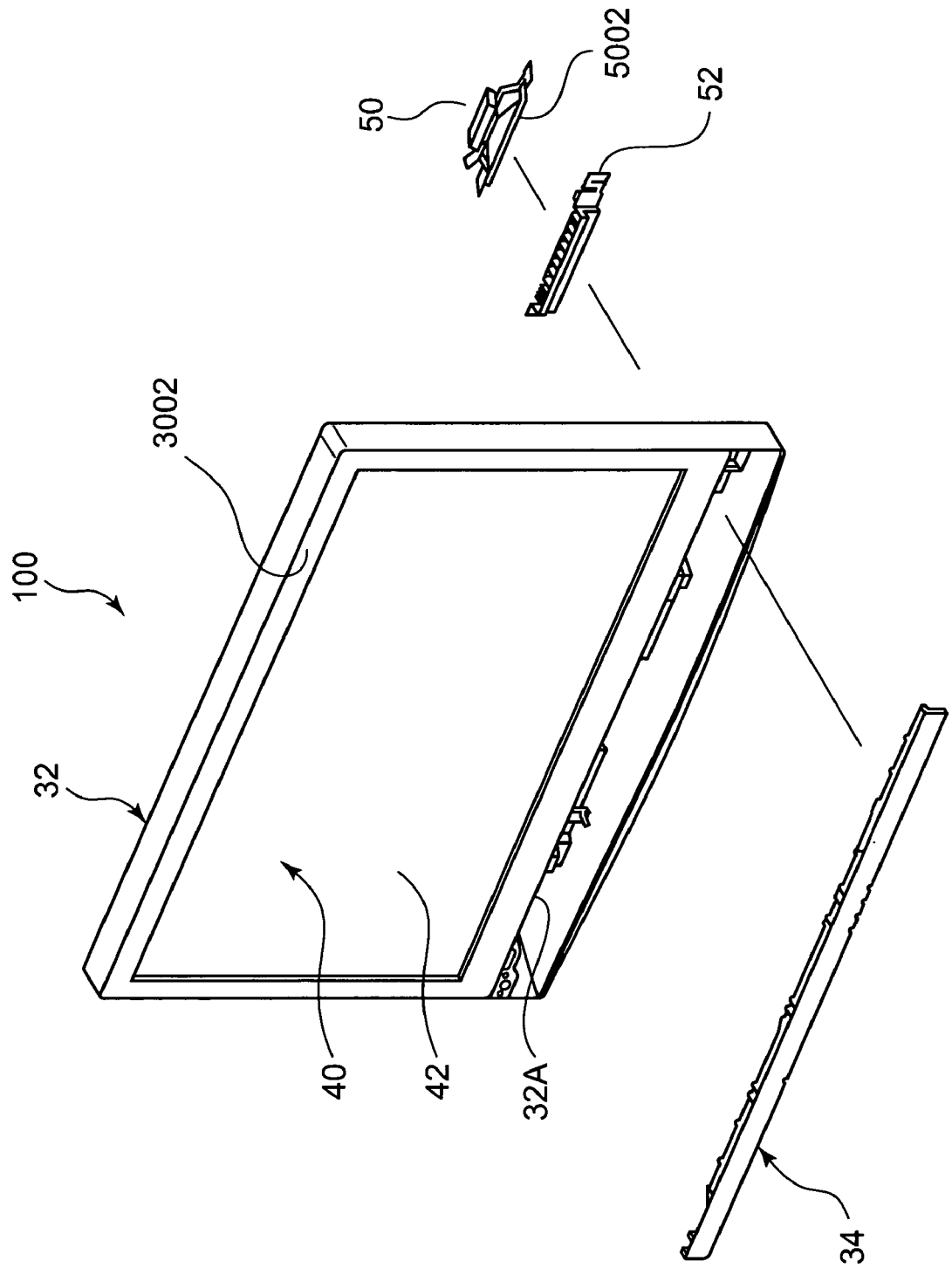
FIG. 2 is an exploded perspective view of the projection television apparatus 100.

As shown in FIGS. 1, 2, the projection television apparatus 100 includes a cabinet 30. The cabinet 30 has incorporated therein an optical system 10 (see FIG. 10), a rear projection screen 40, and speakers 50. The cabinet 30 has a frame body 31, and a rectangular screen frame 32 attached to the front of the frame body 31. The rear projection screen 40 is attached to the screen frame 32 such that an image display surface 42 thereof for displaying images is fitted inside the screen frame 32. The image display surface 42 is rectangular. A front surface 3002 of the cabinet 30 is formed of both a surface of the screen frame 32 facing frontward and the rear projection screen 40. The optical system 10 is configured to emit a light beam of television image projection light onto a back opposed to the image display surface 42 of the rear projection screen 40, to display television images on the image display surface 42.

Figure 10:
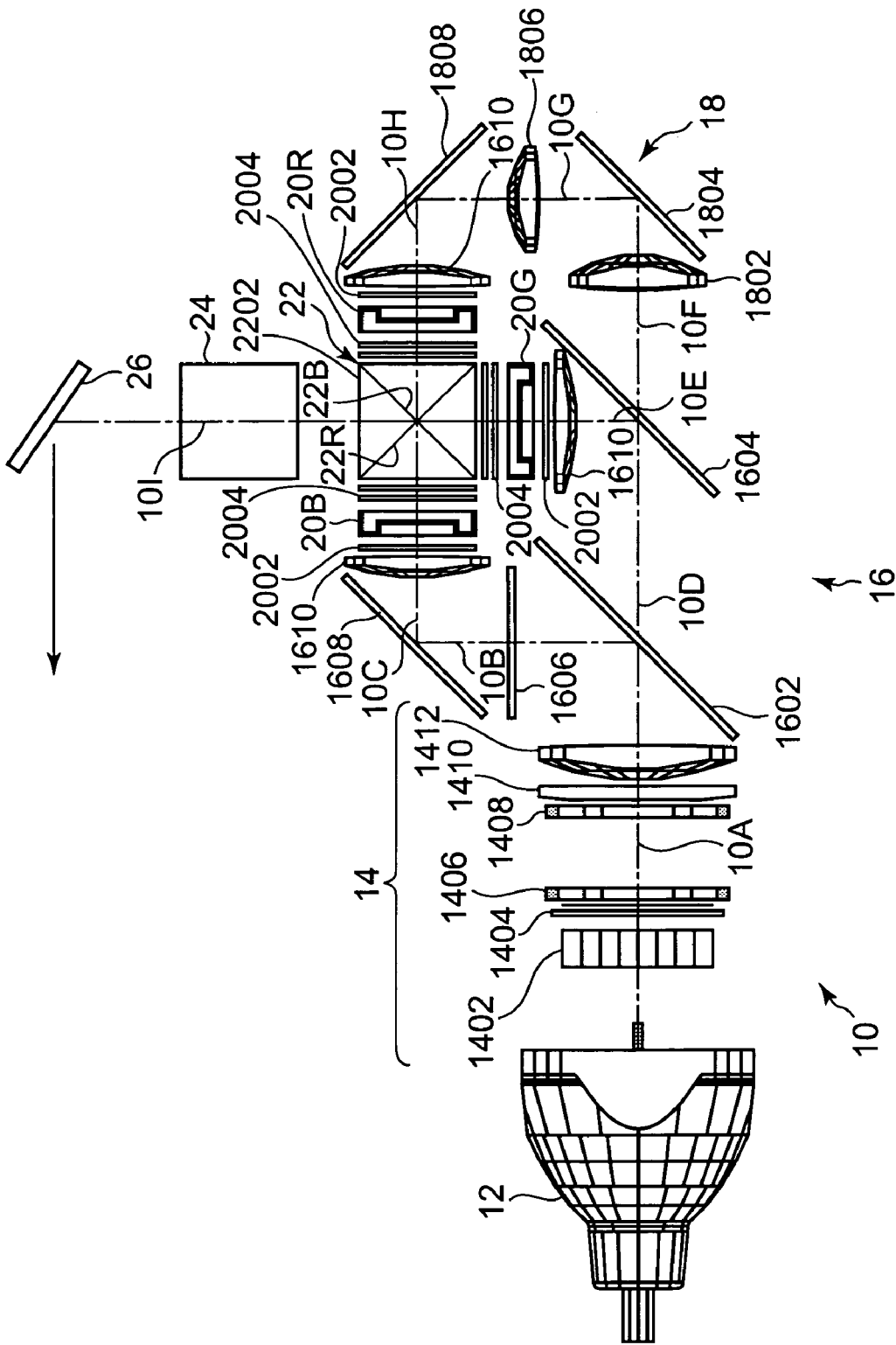
FIG. 10 is a diagram showing the configuration of an optical system of the projection television apparatus 100.

FIG. 10 is a diagram showing the configuration of an optical system of the projection television apparatus 100. The optical system 10 includes, as shown in FIG. 10, a light source 12, an illuminating optical system 10, a color separating optical system 16, a relay optical system 18, three liquid crystal panels 20, a cross dichroic prism 22, a projection lens 24, and a reflecting mirror 26. The illuminating optical system 14, color separating optical system 16, relay optical system 18, three liquid crystal panels 20, and cross dichroic prism 22 are accommodated in a single housing, not shown.

White light emitted from the light source 12 is guided by the illuminating optical system 14 to the color separating optical system 16 and the relay optical system 18, and separated into light beams of three colors, i.e., red (R), green (G), blue (B). These light beams of the three colors pass through the three liquid crystal panels 20 (20R, 20G, 20B) for respectively displaying corresponding image information in the three colors, namely, red (R), green (G), blue (B), for modulation on the basis of the image information. Then, the modulated light beams are synthesized by the cross dichroic prism 22 into a single beam of television image projection light. And this television image projection light beam is projected onto the back of the screen 40 via the projection lens 24 and the reflecting mirror 26, whereby color images are projected on the image display surface 42 being the front surface of the screen 40.

Although image forming means for generating the television image projection light beam is formed of the three liquid crystal panels 20 and the cross dichroic prism 22 in the present example, various types of known image forming means may be adoptable. The illuminating optical system 14 includes a concave lens 1402, a UV cut filter 1404, first and second fly-eye lenses 1406, 1408, a PS conversion element 1410, a condenser lens 1412, as arrayed in this order. A light beam from the light source 12 passes through these members for entrance into the color separating optical system 16. For convenience of explanation, an optical path in the optical system 10 extending from the light source 12 to the color separating optical system 16 is called a first optical path 10A. The condenser lens 1412 is disposed so as to cross the first optical path 10A, at 90° in the present embodiment.

The color separating optical system 16 has a blue reflecting dichroic mirror 1602 for reflecting a blue light beam and allowing green and red light beams to pass therethrough, and a green reflecting dichroic mirror 1604 for reflecting a green light beam and allowing a red light beam to pass therethrough. These two dichroic mirrors 1602, 1604 are disposed so as to cross the first optical path 10A, at 45° in the present embodiment. Of the light beams output from the illuminating optical system 14, a blue light beam, after reflected by the blue reflecting dichroic mirror 1602, passes through the liquid crystal panel 20B via a UV absorbing filter 1606, a total reflecting mirror 1608, and a condenser lens 1610 to reach the cross dichroic prism 22. For convenience of explanation, an optical path in the optical system 10 extending from the blue reflecting dichroic mirror 1602 to the total reflecting mirror 1608 is called a second optical path 10B, and an optical path in the optical system 10 extending from the total reflecting mirror 1608 to the cross dichroic prism 22 is called a third optical path 10C. In the present embodiment, the first optical path 10A and the second optical path 10B cross at right angles, and the second optical path 10B and the third optical path 10C also cross at right angles.

Of the light beams passed through the blue reflecting dichroic mirror 1602, a green light beam, after reflected by the green reflecting dichroic mirror 1604, passes through the liquid crystal panel 20G via the condenser lens 1610 to reach the cross dichroic prism 22. For convenience of explanation, an optical path in the optical system 10 extending from the blue reflecting dichroic mirror 1602 to the green reflecting dichroic mirror 1604 is called a fourth optical path 10D, and an optical path in the optical system 10 extending from the green reflecting dichroic mirror 1604 to the cross dichroic prism 22 is called a fifth optical path 10E. In the present embodiment, the first optical path 10A and the fourth optical path 10D are positioned coaxial, and the fourth optical path 10D and the fifth optical path 10E cross at right angles.

Of the light beams passed through the blue reflecting dichroic mirror 1602, a red light beam, after passed through the green reflecting dichroic mirror 1604, passes through the liquid crystal panel 20R via a first relay lens 1802, a total reflecting mirror 1804, a second relay lens 1806, and a total reflecting mirror 1808, all forming the relay optical system 18, to reach the cross dichroic prism 22. For convenience of explanation, an optical path in the optical system 10 extending from the green reflecting dichroic mirror 1604 to the total reflecting mirror 1804 is called a sixth optical path 10F, and an optical path in the optical system 10 extending from the total reflecting mirror 1804 to the total reflecting mirror 1808 is called a seventh optical path 10G, and further an optical path in the optical system 10 extending from the total reflecting mirror 1808 to the cross dichroic prism 22 is called an eighth optical path 10H. In the present embodiment, the sixth optical path 10F and the seventh optical path 10G cross at right angles, and the seventh optical path 10G and the eighth optical path 10H also cross at right angles.

The second relay lens 1806 is arranged so as to cross the seventh optical path 10G, at 90° in the present embodiment. Note that the three liquid crystal panels 20B, 20G, 20R respectively have an incidence-side polarizer 2002 on a side which a light beam enters, and an output-side polarizer 2004 on a side from which a light beam exits.

The cross dichroic prism 22 includes a dielectric multilayer film 22B for reflecting a blue light beam and a dielectric multilayer film 22R for reflecting a red light beam. The films 22B and 22R are formed along boundary faces of four rectangular prisms so as to be substantially X-shaped. This cross dichroic prism 22 has three incidence surfaces respectively facing the output sides of the liquid crystal panels 20B, 20G, 20R and crossing optical axes thereof at right angles, and a single output surface 2202 facing the projection lens 24 and crossing a corresponding one of the optical axes thereof at right angles.

A blue light beam entering the cross dichroic prism 22 from the liquid crystal panel 20B corresponding to the blue light beam is reflected by the dielectric multilayer film 22B, for outputting from the output surface 2202 to reach the projection lens 24.

A red light beam entering the cross dichroic prism 22 from the liquid crystal panel 20R corresponding to the red light beam is reflected by the dielectric multilayer film 22R, for outputting from the output surface 2202 to reach the projection lens 24.

A green light beam entering the cross dichroic prism 22 from the liquid crystal panel 20G corresponding to the green light beam passes through the dielectric multilayer films 22B and 22R, for outputting from the output surface 2202 to reach the projection lens 24. For convenience of explanation, a path in the optical system 10 along which light outputting from the cross dichroic prism 22 travels to the projection lens 24 is called a ninth optical path 10I. In the present embodiment, the third optical path 10C and the ninth optical path 10I cross at right angles, and the fifth optical path 10E and the ninth optical path 10I are positioned coaxial, and further the eighth optical path 10H and the ninth optical path 10I cross at right angles.

The projection lens 24 is fixed to the not-shown housing. The projection lens 24 is disposed such that an optical axis thereof passes through the center of the screen 40 in the left-right direction and is positioned on a virtual plane crossing the screen 40 at right angles.

Therefore, a light beam into which three light beams of blue, red, and green are synthesized enters the projection lens 24 from the output surface 2202 of the cross dichroic prism 22, and a television image projection light beam guided by the projection lens 24 and the reflecting mirror 26 is imaged on the back of the screen 40 via the reflecting mirror 26, whereby color images are formed.

Figure 11:
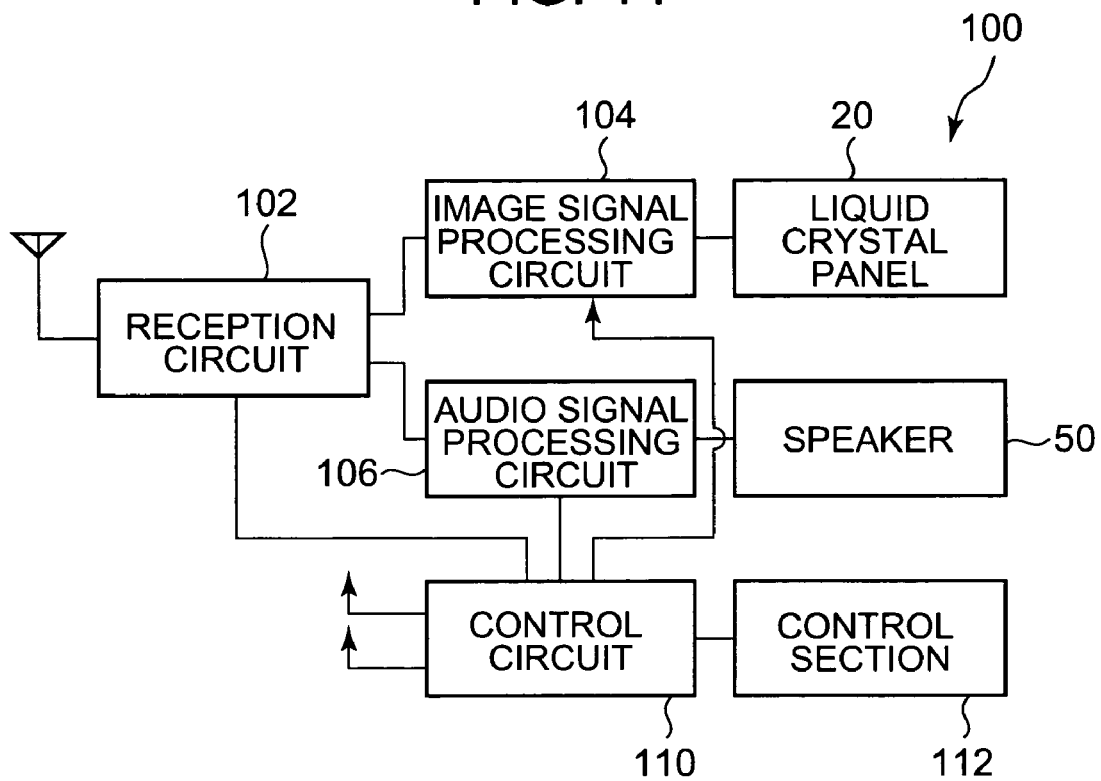
FIG. 11 is a block diagram showing the configuration of electronics of the projection television apparatus 100.

The electronics of the projection television apparatus 100 will be described. FIG. 11 is a block diagram showing the configuration of electronics of the projection television apparatus 100. As shown in FIG. 11, the projection television apparatus 100 includes a reception circuit 102, an image signal processing circuit 104, an audio signal processing circuit 106, a control circuit 110, a control section 112, and also the liquid crystal panels 20 mentioned above.

The reception circuit 102 selects channels on the basis of commands from the control circuit 110, demodulates a television signal received via an antenna, and separates the signal into an image signal and an audio signal for output. The image signal processing circuit 104 performs necessary signal processing on the image signal to generate image information in three colors, red (R), green (G), blue (B), so as to supply them to the three liquid crystal panels 20, respectively. The audio signal processing circuit 106 performs necessary signal processing and amplification processing on the audio signal to generate an audio output signal so as to supply it to the speakers 50. As a result, sounds are outputted from the speakers 50.

The control section 112 is a section for performing therethrough various manipulations and settings involved to view broadcasts by the projection television apparatus 100. For example, channel selection, volume control, input switching, and the like can be performed. The control circuit 110 controls the reception circuit 102, image signal processing circuit 104, and audio signal processing circuit 106 on the basis of manipulation of the control section 112.

Although not shown, the control circuit 110 includes external input terminals for inputting image and audio signals supplied from an external apparatus, such as a DVD player or a videocassette recorder, and an input switching circuit for inputting by switching the image and audio signals supplied to these external input terminals, to the image signal processing circuit 104 and the audio signal processing circuit 106, respectively. It is configured such that the image and audio signals supplied to the external input terminals are fed to the image signal processing circuit 104 and the audio signal processing circuit 106 via the input switching circuit through manipulation of the control section 112.

Figure 3:
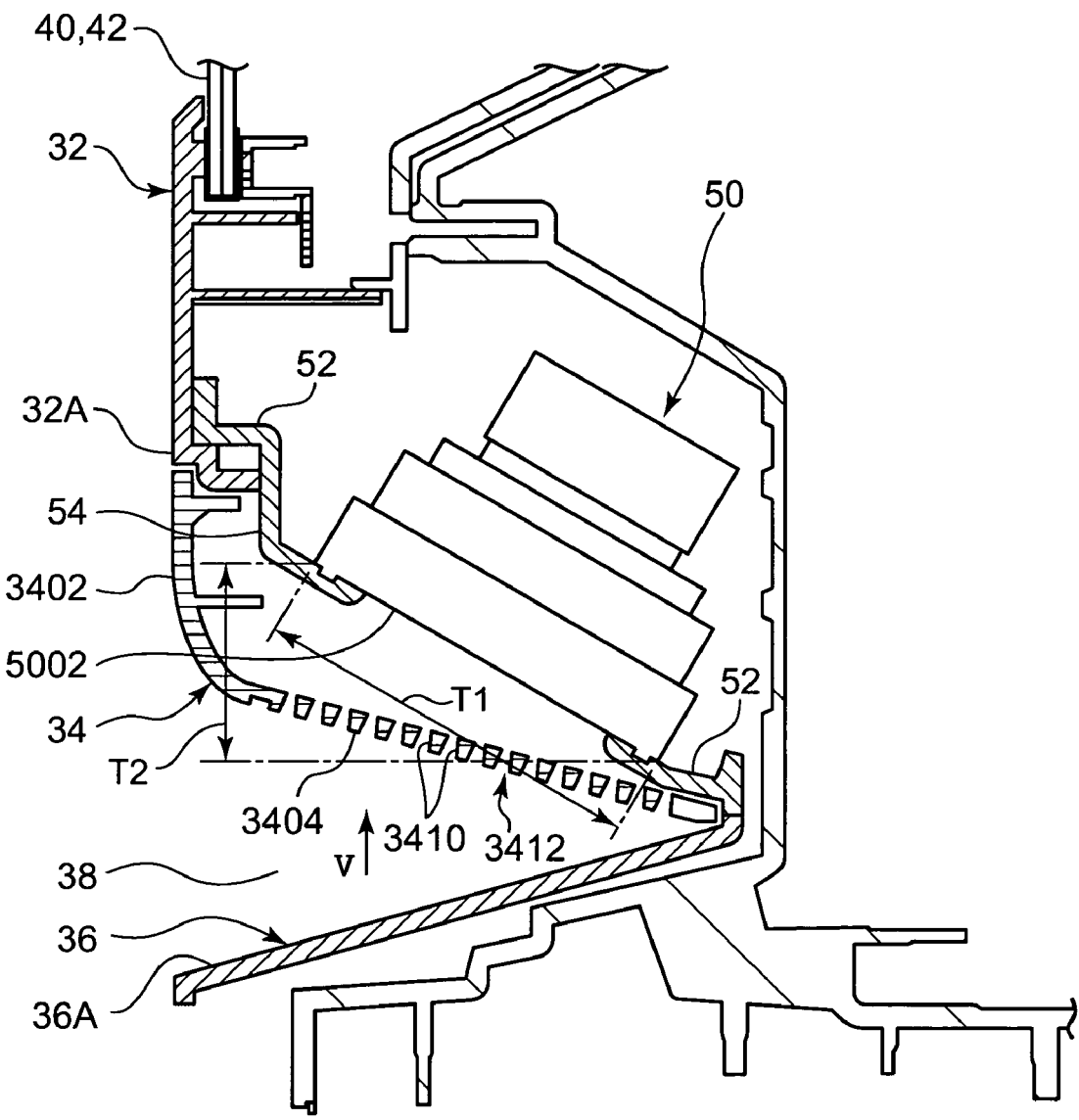
FIG. 3 is a sectional view taken along a line III-III of FIG. 1.
Figure 4:
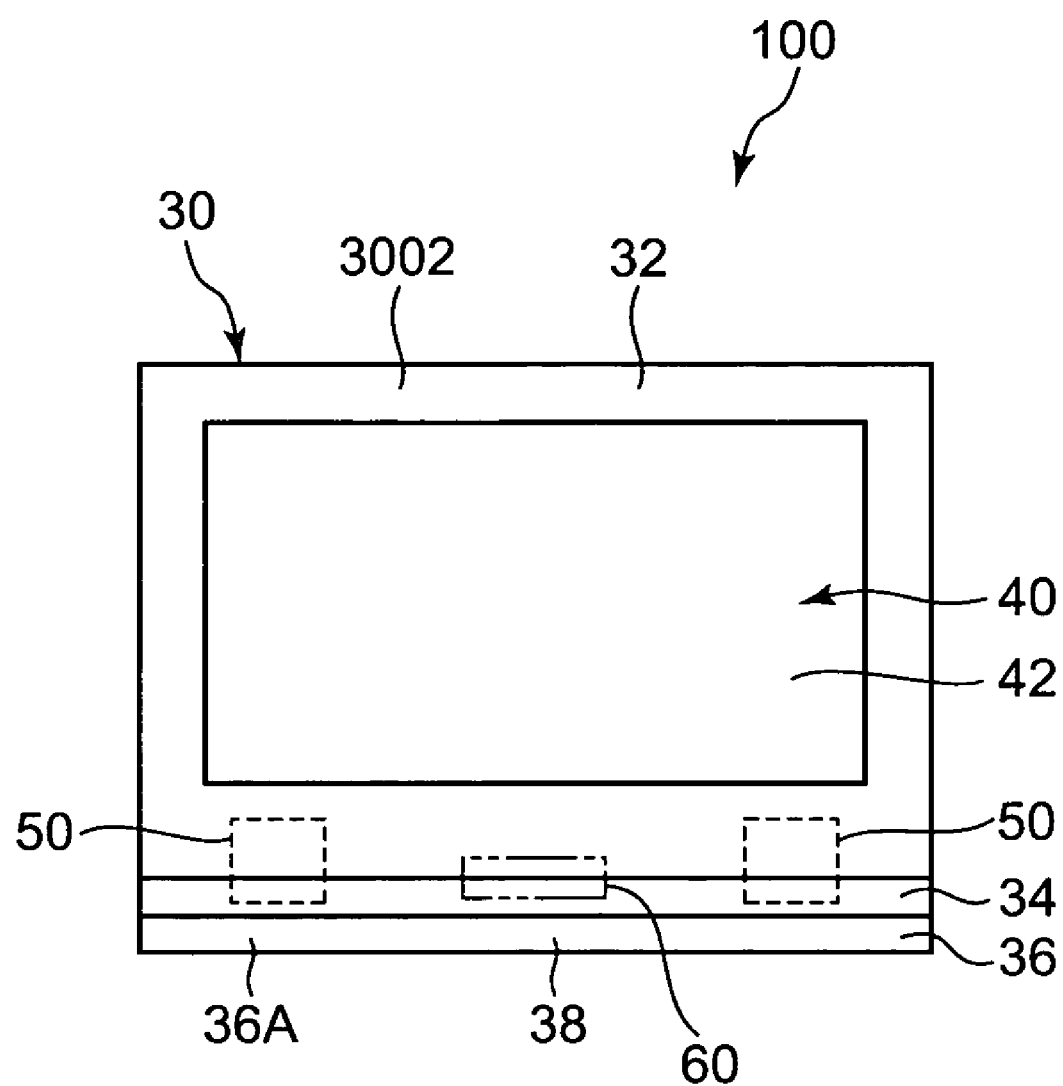
FIG. 4 is a front view of the projection television apparatus 100.
Figure 5:
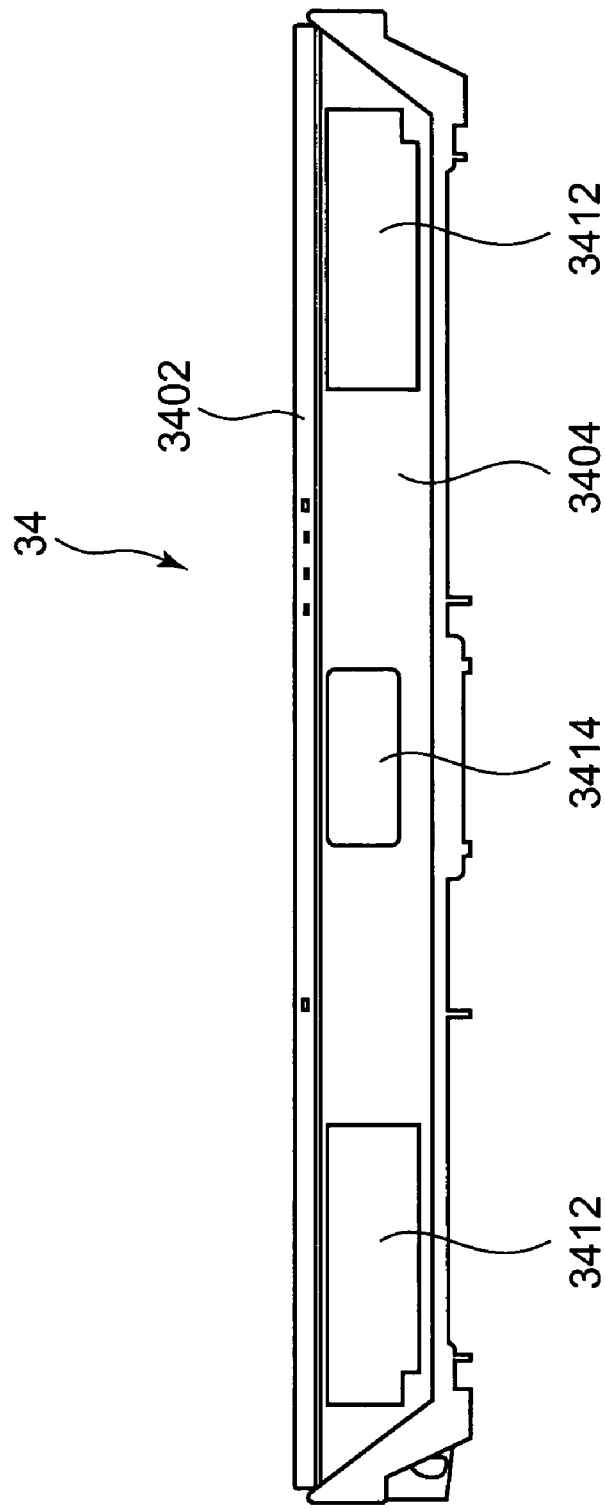
FIG. 5 is a diagram as viewed from a position indicated by an arrow V in FIG. 3.

Next, the speakers 50 and a sound reflecting surface 36A, which constitute a main portion of the present invention, will be described. FIG. 3 is a sectional view taken along a line III-III of FIG. 1, FIG. 4 is a front view of the projection television apparatus 100; and FIG. 5 is a diagram as viewed from a position indicated by an arrow V in FIG. 3.

A speaker grill 34 is attached below a lower side 32A of the rectangular screen frame 32 so as to extend along the lower side 32A. The speaker grill 34 includes, as shown in FIG. 3, a front plate 3402 facing frontward, and a slant plate 3404 (corresponding to a mounting plate in the claims) extending backwards and obliquely downwards from a lower end of the front plate 3402. Therefore, the slant plate 3404 slopes down with respect to the front of the rear projection screen 40. Moreover, a reflector 36 is disposed below the slant plate 3404. The reflector 36 has the same front-rear dimension as that of the slant plate 3404, and extends along the slant plate 3404 in a horizontal direction, below the slant plate 3404.

A rear end of the reflector 36 is positioned immediately below a rear end of the slant plate 3404. The reflector 36 is disposed so as to gradually slope down from the rear end to a front end thereof. Therefore, the reflector 36 slopes up as viewed from the front of the rear projection screen 40. Note that the front end of the reflector 36 is positioned flush with the lower side 32A of the screen frame 32 and a front surface of the speaker grill 34. In the present embodiment, the reflector 36 is formed integrally with the screen frame 32.

The sound reflecting surface 36A is formed of an upper surface of the reflector 36. Therefore, the sound reflecting surface 36A slopes up as viewed from the front, and extends below and along the slant plate 3404 in the horizontal direction. Note that the sound reflecting surface 36A serves to reflect sounds radiated from the speakers 50 frontward. Various known materials can be employed for the sound reflecting surface 36A. In the present embodiment, the sound reflecting surface 36A is formed of the upper surface of the reflector 36 made of a synthetic resin.

Moreover, at both left and right ends of the slant plate 3404 and at both left and right ends of the reflector 36 are lateral walls 3210 of the screen frame 32, as shown in FIG. 1. Therefore, the slant plate 3404 and the reflector 36 form a space 38 having a V-shaped cross section and being open frontward so as to extend throughout the length of the lower side 32A of the screen frame 32. As shown in FIGS. 3, 5, sound radiating regions 3412, in each of which many tiny sound radiating holes 3410 are formed, are disposed on both right and left sides of the slant plate 3404, and a notch 3414 is also provided approximately in the middle of the slant plate 3404 in the left-right direction.

As shown in FIG. 4, the speakers 50 are disposed below and on both left and right sides of the rear projection screen 40. Each of the speakers 50 is attached to a speaker bracket 52, as shown in FIGS. 2, 3. The speaker brackets 52 are attached to the screen frame 32. The speakers 50 are disposed above the sound radiating regions 3412 on both left and right sides of the slant plate 3404, with their sound radiating surfaces sloping down as viewed from the front of the cabinet 30.

More specifically, as shown in FIGS. 2, 3, the speakers 50 each have a sound radiating surface through which sounds are radiated. The sound radiating surface is a front surface 5002 of the speaker 50. The sound radiating surface or the front surface 5002 of the speaker 50 means, if the speaker 50 is of a cone type having a conical diaphragm, a virtual plane flush with a front rim of the diaphragm, and, if the speaker 50 is of a flat panel type having a flat diaphragm, a front surface of the diaphragm. In short, it means the most frontward surface or virtual plane of the speaker 50 in a sound radiating direction. The speakers 50 are disposed such that their front surfaces 5002 (sound radiating surfaces) slope down as viewed from the front.

Figure 6:
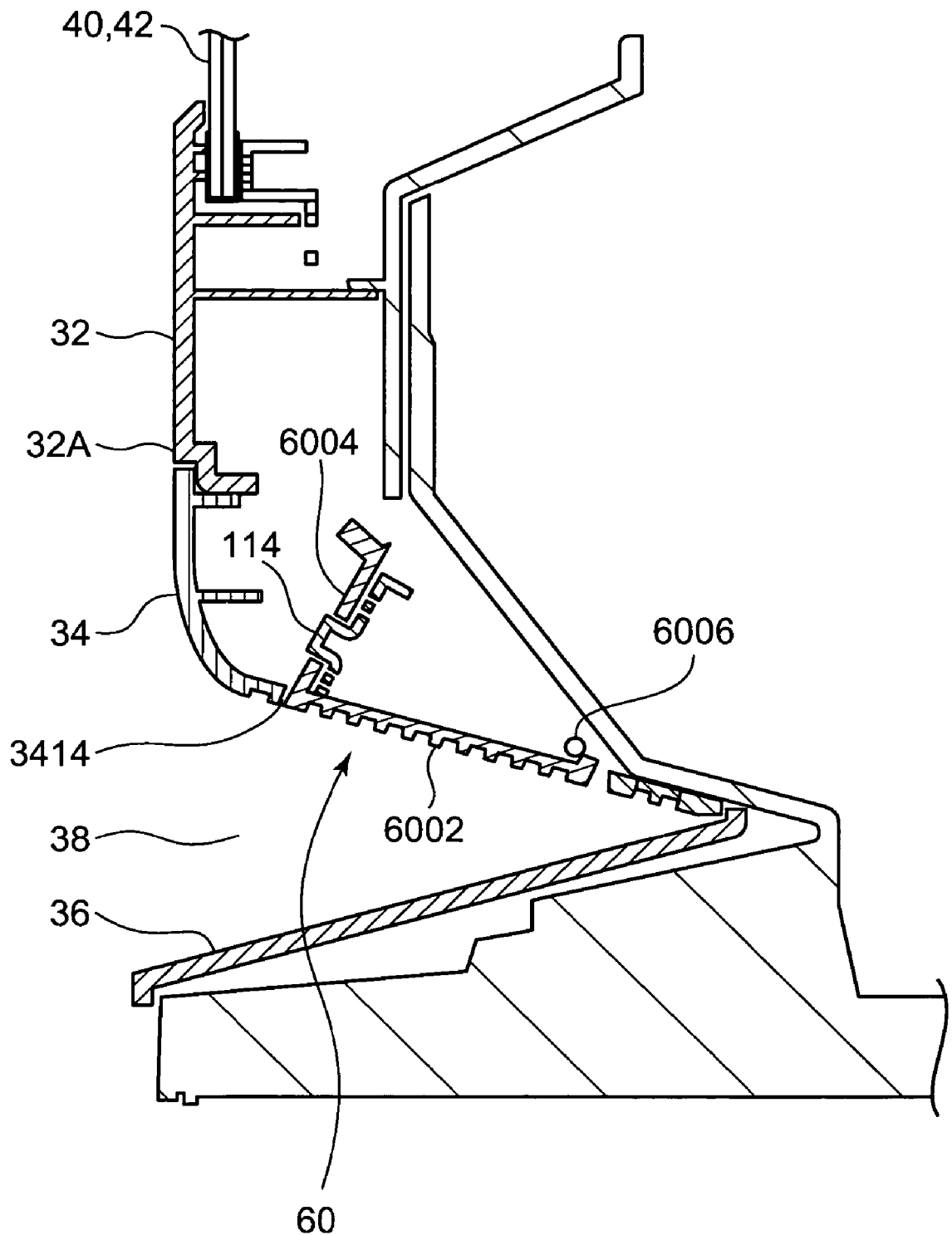
FIG. 6 is a sectional view taken along a line VI-VI of FIG. 1, for explaining retractable operation of a control panel.
Figure 7:
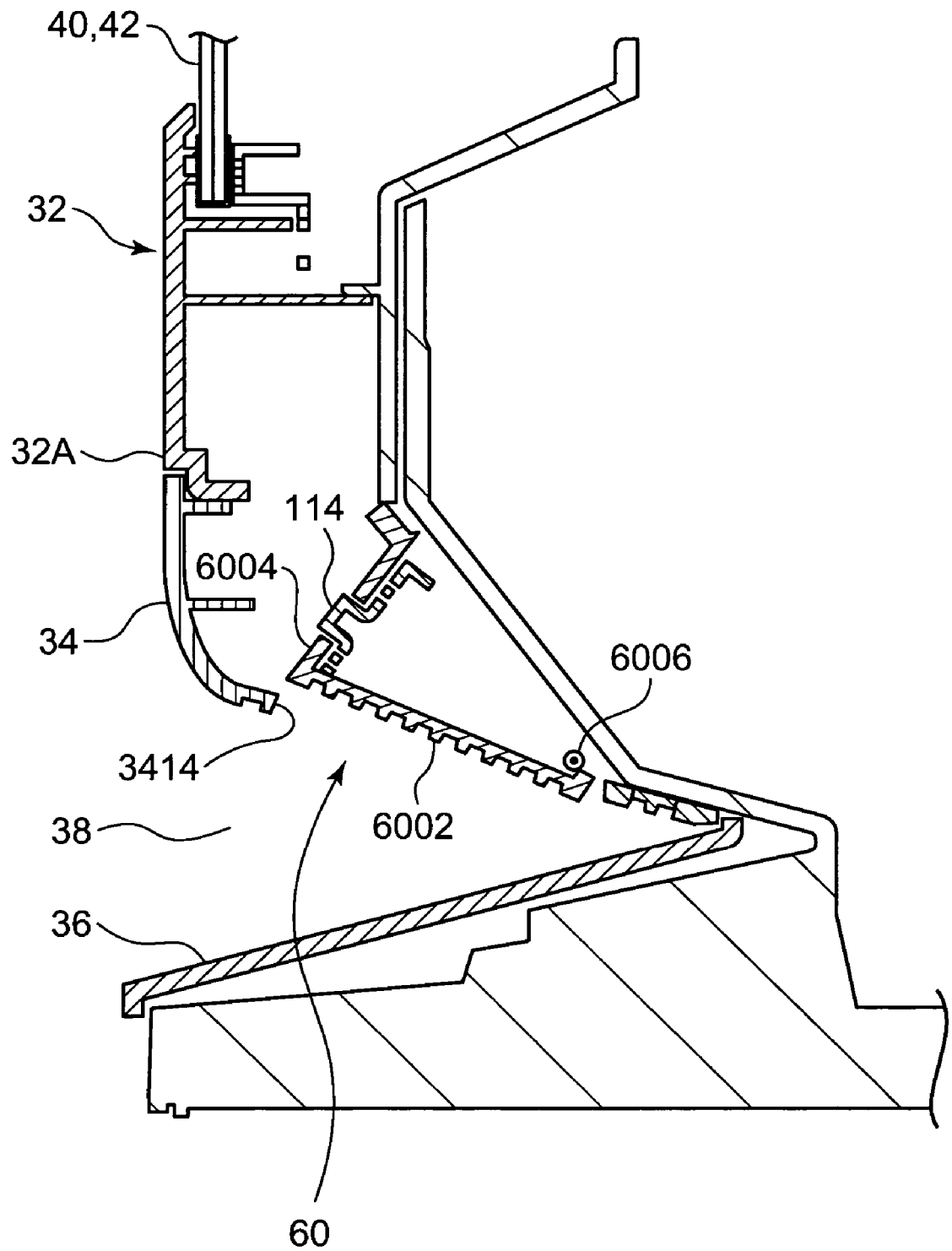
FIG. 7 is a sectional view taken along the line VI-VI of FIG. 1, for explaining the retractable operation of the control panel.
Figure 8:
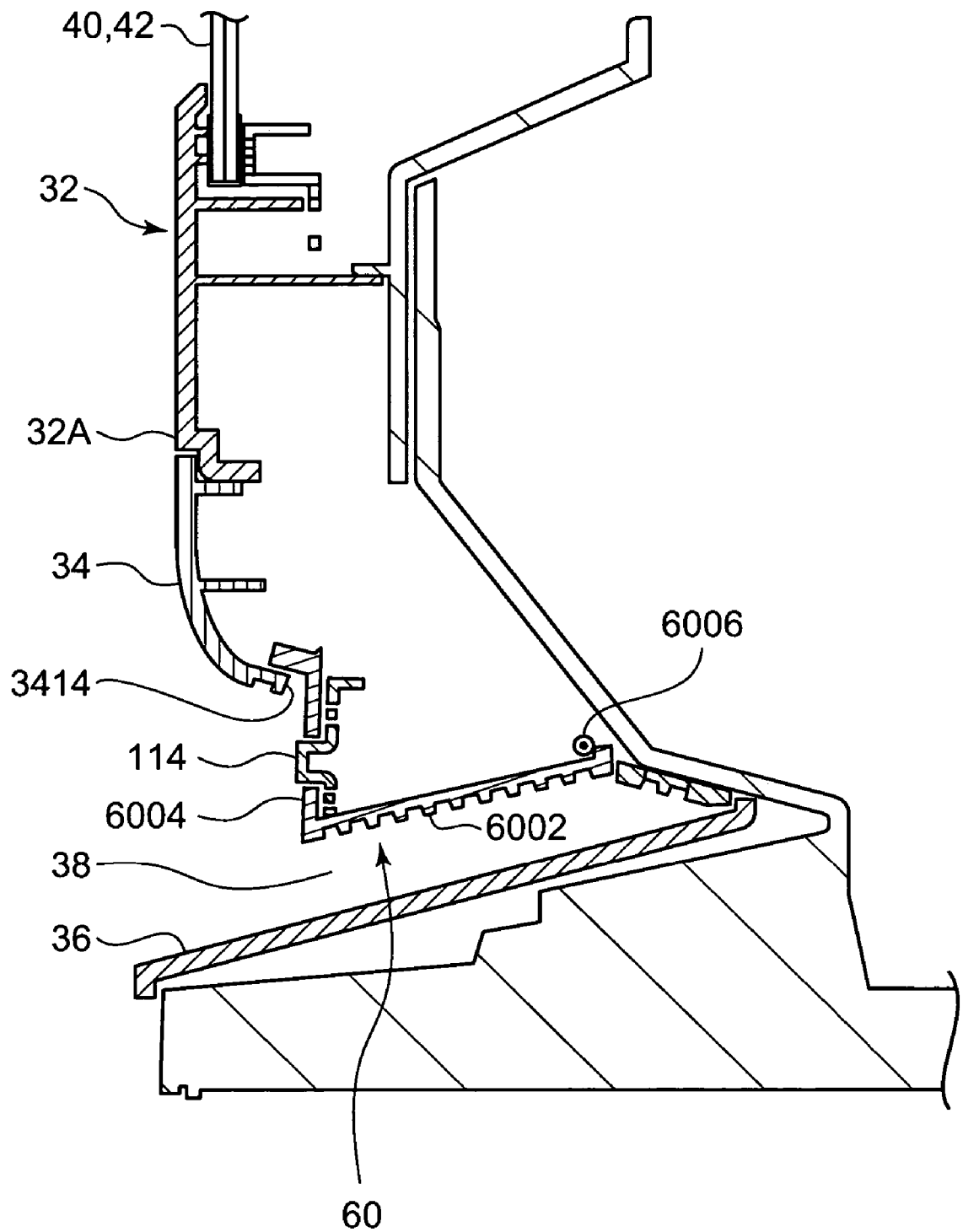
FIG. 8 is a sectional view taken along the line VI-VI of FIG. 1, for explaining the retractable operation of the control panel.

FIGS. 6-8 are sectional views taken along a line VI-VI of FIG. 1, for explaining retractable operation of a control panel. In the present embodiment, the control panel 60 including a part of the above-mentioned control section 112 is provided so as to be retractable toward the space 38 via the notch 3414 of the slant plate 3404.

The control section 112 on the control panel 60 includes control buttons 114 such as, e.g., a channel selecting button, a volume controlling button, and an input switching button. The control panel 60 has a board 6002, and a front plate 6004 erecting from a front end of the board 6002. The control buttons 114 are arranged on the front plate 6004. Note that an electrically functioning section arranged behind the control buttons 114 is not shown.

Figure 9A:
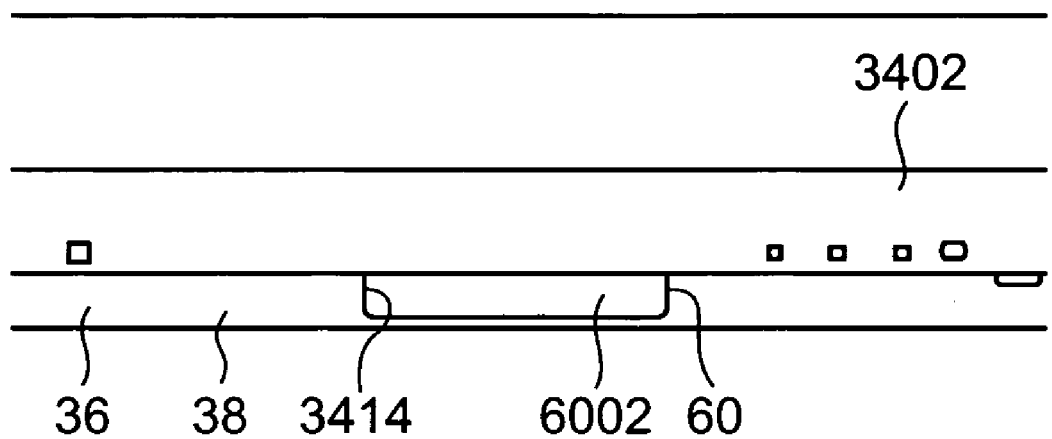
FIGS. 9A, 9B are front views for explaining the retractable operation of the control panel.
Figure 9B:
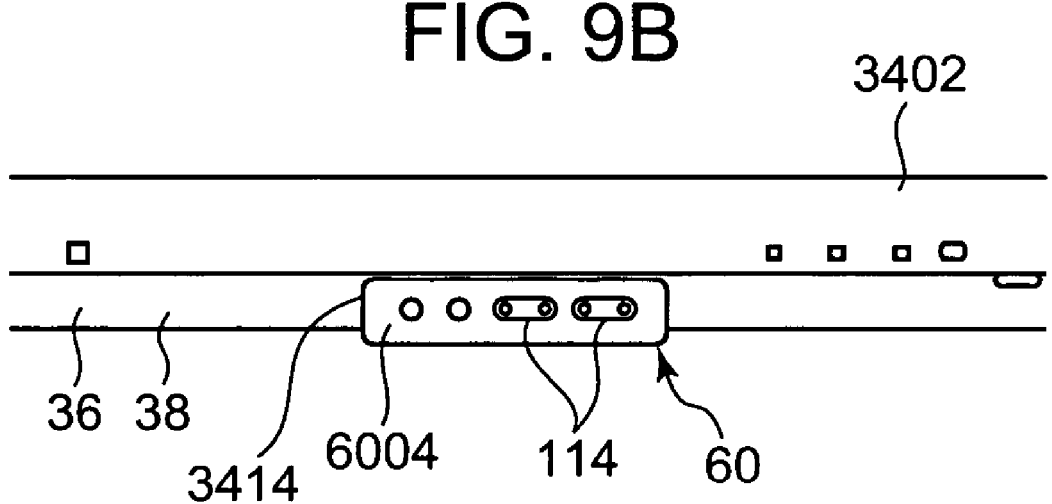

FIGS. 9A, 9B are front views for explaining the retractable operation of the control panel. As shown in FIGS. 6-8, the control panel 60 has a rear end of the board 6002 coupled to a shaft 6006 at a rear end of the notch 3414, such that the control panel 60 is vertically swingable. And as shown in FIGS. 6, 9A, the board 6002 becomes flush with the slant plate 3404 when the control buttons 114 are accommodated above the slant plate 3404 in an accommodated position. Once the control buttons 114 are pushed upwards as shown in FIG. 7, the front plate 6004 comes out in the middle of the space 38 in the left-right direction, to expose the control buttons 114 below the slant plate 3404 in a used position, as shown in FIGS. 8, 9B. When the control buttons 114 are pushed further upwards again, the control buttons 114 are brought into the accommodated position. As a mechanism for swinging the control panel 60 between the used position and the accommodated position in this way, various known structures, such as a heart cam mechanism and a link mechanism, can be adopted.

According to the present embodiment, even if large speakers 50 are used in the projection television apparatus, the speakers 50 are disposed with their sound radiating surfaces (front surfaces 5002) sloping down as viewed from the front of the cabinet 30. Thus, as shown in FIG. 3, if it is supposed that the height of the outline of the front surface of each speaker 50 in the up-down direction with its sound radiating surface facing frontward is T1, then the height of the outline of the front surface of the speaker 50 in the up-down direction with its sound radiating surface sloping down equals T2 when the cabinet 30 is viewed from the front. Thus, the height of the outline of the front surface of the speaker 50 in the up-down direction can be reduced remarkably.

Moreover, although the sound reflecting surface 36A is used, the reflector 36 is disposed such that the sound reflecting surface 36A, which is the upper surface thereof, slopes up as viewed from the front, and thus the height of the outline of the reflector 36 in the up-down direction is small when the cabinet 30 is viewed from the front. Therefore, this configuration is greatly advantageous in reducing the height of the projection television apparatus 100 in the up-down direction.

Furthermore, since the height of the projection television apparatus 100 in the up-down direction can be reduced, a pedestal can be eliminated, and thus a cost reduction can be achieved and a large degree of freedom in design can also be ensured. Furthermore, since the sound radiating holes 3410 are provided in the slant plate 3404 which slopes down as viewed from the front, they are not easily seen from the user, and thus this configuration is advantageous in enhancing the appearance.

Furthermore, since the sound radiating holes 3410 are provided at the locations not easily seen from the user, the design of the sound radiating holes 3410 can be changed from a known aesthetic fine hole pattern to a grid pattern (a grid pattern in which elongated grooves extending in the front-rear direction are arranged in the left-right direction, a grid pattern in which elongated grooves extending in the left-right direction are arranged in the up-down direction, or the like), and thus the sound radiating holes 3410 can be fabricated in inexpensive shapes and structures. Consequently, this configuration is advantageous in reducing the costs.

Furthermore, since the sound radiating holes 3410 are provided in the slant plate 3404 which slopes down as viewed from the front, dust and the like hardly enter the cabinet 30 from the sound radiating holes 3410. Therefore, this configuration is also advantageous in blocking entrance of dust into the cabinet 30. Furthermore, by forming the sound radiating holes 3410 into a grid pattern (a grid pattern in which elongated grooves extending in the front-rear direction are arranged in the left-right direction, a grid pattern in which elongated grooves extending in the left-right direction are arranged in the up-down direction, or the like), the sound radiating holes 3410 can have a high aperture ratio to enhance transparency of sounds.

Figure 12:
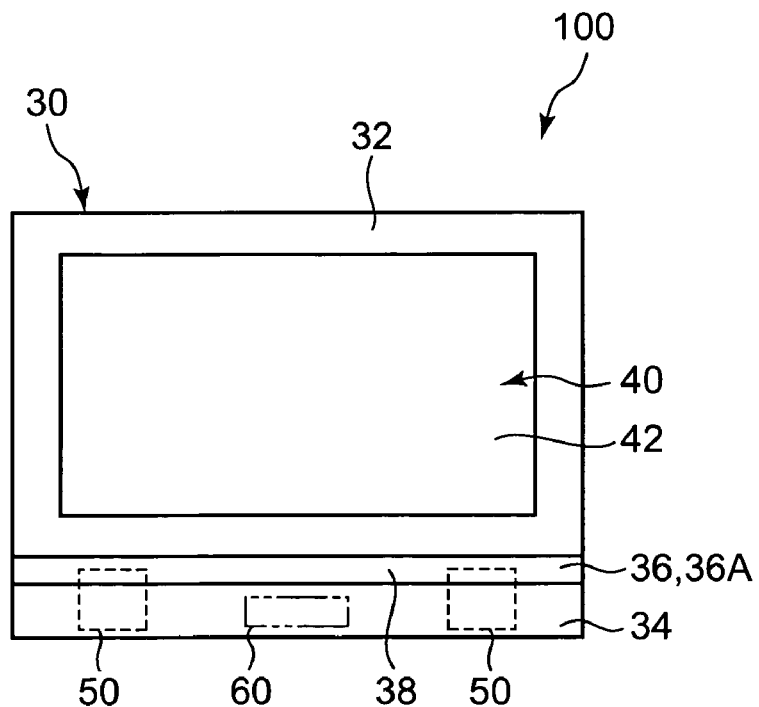
FIG. 12 is a front view showing a modified example of the projection television apparatus 100.

FIGS. 12-16 are front views showing modified examples of the projection television apparatus 100. Note that the case where the sound reflecting surface 36A is positioned below the speakers 50 has been described in the embodiment. However, as shown in FIG. 12, it may alternatively be configured such that the sound reflecting surface 36A is disposed so as to slope down as viewed from the front, below the image display surface 42 (specifically, below the lower side of the screen frame 32), and the speaker grill 34 is disposed below the sound reflecting surface 36A, and further the speakers 50 are disposed with their sound radiating surfaces sloping up as viewed from the front, on a lower surface of the speaker grill 34.

Still alternatively, the control panel 60 retractable toward the space 38 may be disposed on the sound reflecting surface 36A or the speaker grill 34. In this case, this configuration has shortcomings that the sound radiating holes 341 are more easily seen from the user and that dust enters more easily, than in Embodiment 1 mentioned above. However, the height of the projection television apparatus 100 in the up-down direction can be reduced, and a pedestal can be eliminated, thus leading to a cost reduction and ensuring a large degree of freedom in design. Furthermore, the control panel 60 is arranged by utilizing a dead space, which is thus advantageous in miniaturizing the projection television apparatus 100.

Figure 13:
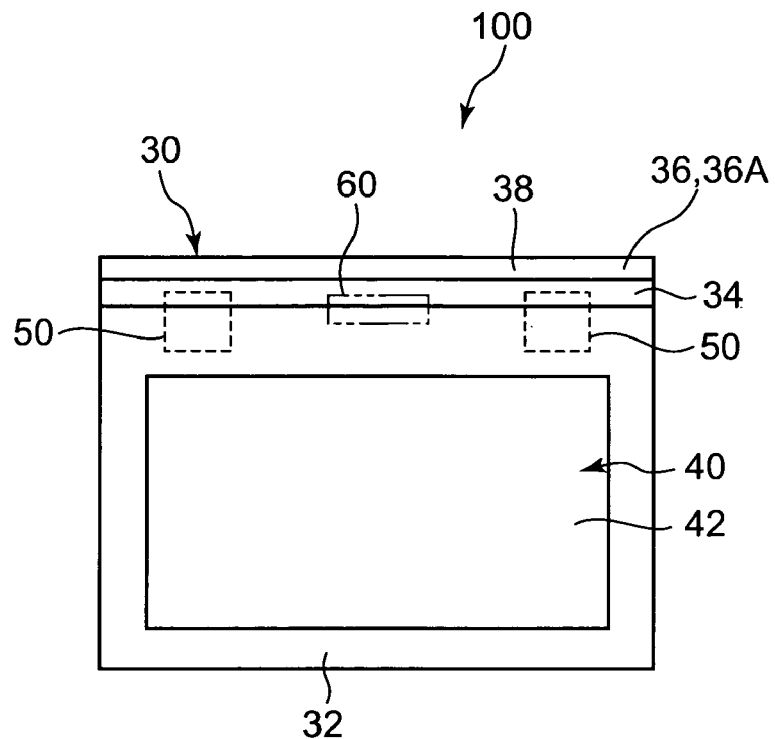
FIG. 13 is a front view showing another modified example of the projection television apparatus 100.

Still alternatively, it may be configured, as shown in FIG. 13, such that the speakers 50 are disposed with their sound radiating surfaces sloping up as viewed from the front, above the image display surface 42 (specifically, above an upper side of the screen frame 32), and such that the sound reflecting surface 36A is disposed above the speaker grill 34 so as to slope down as viewed from the front. That is, at a location of the cabinet 30 which is above an upper side of the image display surface 42 (specifically, the upper side of the screen frame 32) is the slant plate 3404 of the speaker grill 34, which extends throughout the length as viewed in the left-right direction behind the image display surface 42 and which slopes up as viewed from the front.

The speakers 50 are disposed below the left and right sides of the slant plate 3404, with their sound radiating surfaces sloping up as viewed from the front. And the sound radiating regions 3414, each being formed of many tiny sound radiating holes therein, are arranged over regions of the slant plate 3404 through which sounds of the speakers 50 are radiated and which are faced by the front surfaces of the speakers 50, respectively.

The reflector 36 is formed above the slant plate 3404 so as to extend throughout the length of the slant plate 3404, and the sound reflecting surface 36A is formed on a lower surface of the reflector 36 so as to extend throughout the length of the reflector 36 and slope down as viewed from the front. And the space 38 being open frontward is formed between the slant plate 3404 and the sound reflecting surface 36A so as to extend along these slant plate 3404 and sound reflecting surface 36A in the left-right direction. The control panel 60 retractable toward the horizontally extending space 38 is disposed on the sound reflecting surface 36A or the speaker grill 34.

In this case also, similarly to the case of FIG. 12, this configuration has shortcomings that the sound radiating holes 341 are more easily seen from the user and that dust enters more easily, than in Embodiment 1 mentioned above. However, the height of the projection television apparatus 100 as viewed in the up-down direction can be reduced, and a pedestal can be eliminated, and thus a cost reduction can be implemented and a large degree of freedom in design can be ensured. Furthermore, the control panel 60 is arranged by utilizing a dead space, which is thus advantageous in downsizing the projection television apparatus 100.

Figure 14:
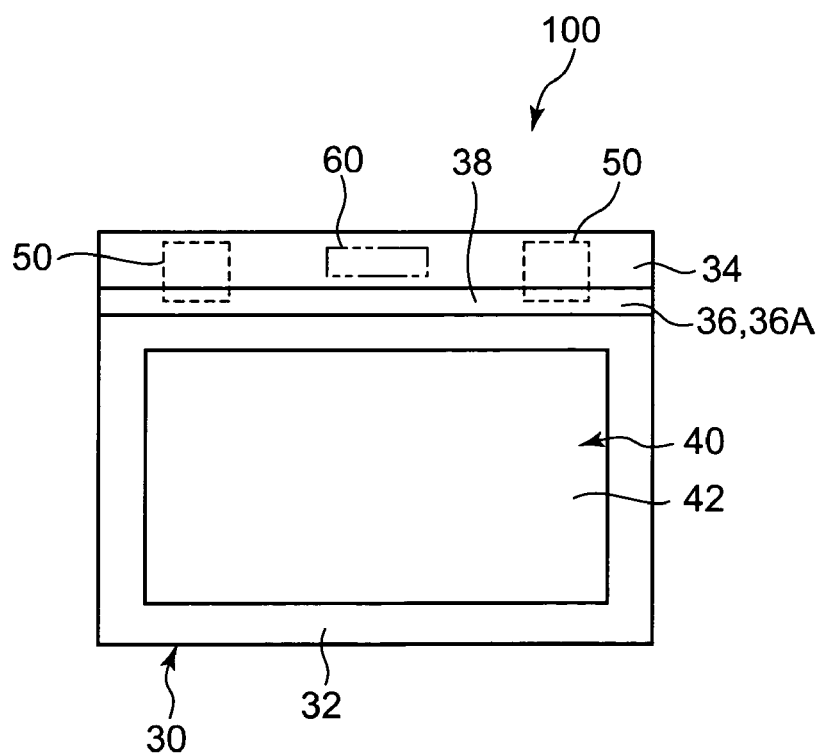
FIG. 14 is a front view showing still another modified example of the projection television apparatus 100.

Still alternatively, it may be configured, as shown in FIG. 14, such that the sound reflecting surface 36A is disposed so as to slope up as viewed from the front, above the image display surface 42 (specifically, above the upper side of the screen frame 32), and such that the speakers 50 are disposed above this sound reflecting surface 36A via the speaker grill 34, with their sound radiating surfaces sloping down as viewed from the front.

By arranging them in this way, the space 38 being open frontward is provided by the slant plate 3404 and the sound reflecting surface 36A so as to extend in the horizontal direction above the upper side of the screen frame 32, whereby it may be configured such that the control panel 60 retractable toward the horizontally extending space 38 is provided on the sound reflecting surface 36A or the speaker grill 34. In this case, advantages similar to those of Embodiment 1 can be attained.

Figure 15:
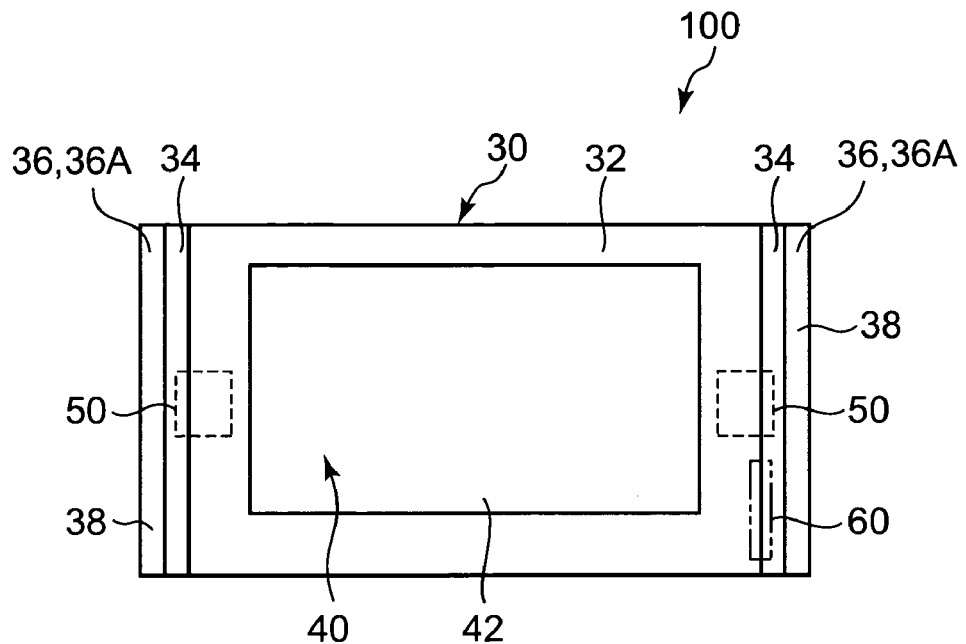
FIG. 15 is a front view showing still another modified example of the projection television apparatus 100.

Still alternatively, it may be configured, as shown in FIG. 15, such that the speakers 50 are disposed on both left and right sides of the image display surface 42 (specifically, area around outer peripherals of left and right sides of the screen frame 32), with their sound radiating surfaces opening out as viewed from the front, and such that the sound reflecting surfaces 36A extend outside the speaker grills 34 in the up-down direction, in a manner closing in as viewed from the front, respectively. That is, at locations of the cabinet 30 which are positioned outside the left and right sides of the image display surface 42 (specifically, the left and right sides of the screen frame 32) are the slant plates 3404 of the speaker grills 34, which extend throughout the length of the left and right sides of the image display surface 42 in the up-down direction behind the image display surface 42, and which open out as viewed from the front, respectively.

The speakers 50 are disposed so as to face inner surfaces of the slant plates 3404 of the speaker grills 34, with their sound radiating surfaces opening out as viewed from the front, respectively. The sound radiating regions 3414, each being formed of many tiny sound radiating holes therein, are disposed at locations of the slant plates 3404 through which sounds of the speakers 50 are radiated and which are faced by the front surfaces of the speakers 50, respectively.

The reflectors 36 are formed outside the slant plates 3404 of the speaker grills 34 so as to extend throughout the length of the slant plates 3404, and the sound reflecting surfaces 36A are formed on surfaces of the reflectors 36 facing the slant plates 3404 so as to extend throughout the length of the reflectors 36, in a manner closing in as viewed from the front, respectively. The spaces 38 being open frontward are formed between the slant plates 3404 and the sound reflecting surfaces 36A so as to extend along the slant plates 3404 and the sound reflecting surfaces 36A in the up-down direction, respectively, and the control panel 60 retractable toward these left and right spaces 38 is disposed on the sound reflecting surface 36A or the speaker grill 34 on either side. In this case, the width of the projection television apparatus 100 in the left-right direction can be reduced.

Moreover, since the speakers 50 are disposed on the left and right sides of the image display surface 42, respectively, the height of the projection television apparatus 100 in the up-down direction can be reduced compared with their arrangement above or below the image display surface 42. Therefore, a pedestal can be eliminated, and thus a cost reduction can be achieved and a large degree of freedom in design can be ensured. Furthermore, since the control panel 60 is retractably disposed in either of the spaces 38, the control panel 60 is disposed by utilizing a dead space, which is thus advantageous in downsizing the projection television apparatus 100.

Figure 16:
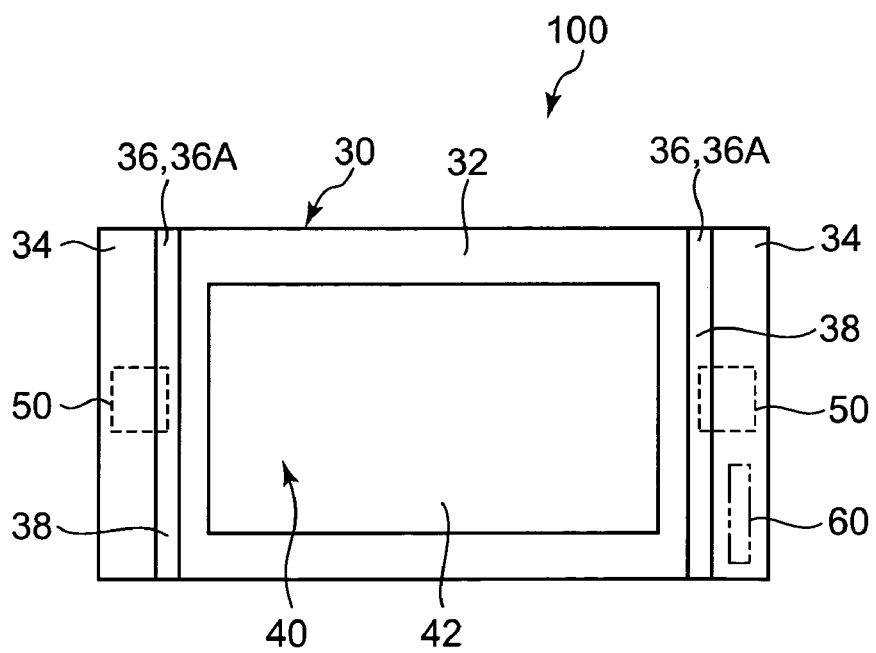
FIG. 16 is a front view showing yet another modified example of the projection television apparatus 100.

Still alternatively, it may be configured, as shown in FIG. 16, such that the sound reflecting surfaces 36A extend vertically on the left and right sides of the image display surface 42 (specifically, outside the left and right sides of the screen frame 32), in a manner opening out as viewed from the front, and such that the speakers 50 are disposed outside these sound reflecting surfaces 36A via the corresponding speaker grills 34, with their sound radiating surfaces closing in as viewed from the front, respectively. By arranging them in this way, it may be configured such that the spaces 38 being open frontward are provided by the slant plates 3404 of the speaker grills 34 and the sound reflecting surfaces 36A so as to extend vertically, outside the left and right sides of the screen frame 32, respectively, and such that the control panel 60 retractable toward these left and right spaces 38 is provided on the sound reflecting surface 36A or the speaker grill 34 on either side. In this case also, advantages similar to the above embodiment can be attained.

Furthermore, the case where the electronic equipment is the projection television apparatus 100 has been described in the present embodiment. However, the present invention is not limited thereto, but may be applicable to television apparatus, such as, e.g., CRT displays, liquid crystal displays, plasma displays, organic EL displays, and to monitor apparatus for personal computers, and the like.

It should be understood by those skilled in the art that various modifications, combinations, sub-combinations and alterations may occur depending on design requirements and other factors insofar as they are within the scope of the appended claims or the equivalents thereof.

What is claimed is:

1. Electronic equipment comprising:
   a cabinet;
   an image display apparatus that is incorporated into the cabinet and disposed with an image display surface facing a front of the cabinet;
   a mounting plate that is disposed along a length behind the image display surface at an incline that is not parallel or perpendicular to the image display surface;
   speakers that are incorporated into the mounting plate and disposed with sound radiating surfaces inclined as viewed from the front of the cabinet, such that the sound radiating surfaces are not parallel or perpendicular to the image display surface;
   a reflector formed near the mounting plate so as to extend along the length of the mounting plate and form a space that is open toward the front of the cabinet; and
   a sound reflecting surface that is formed on a surface of the reflector for reflecting sounds radiated from the speakers through the space and the front of the cabinet.

2. The electronic equipment according to claim 1, wherein the speakers and the sound reflecting surface are positioned more rearward than the image display surface in a front-rear direction of the cabinet.

3. The electronic equipment according to claim 1, wherein:
   the image display surface is substantially rectangular,
   the speakers are disposed at left and right locations of a lower side of the image display surface behind the image display surface, with the sound radiating surfaces of the speakers sloping down as viewed from the front, and
   the sound reflecting surface is disposed below the speakers so as to extend along the lower side of the image display surface in a left-right direction and slope up as viewed from the front.

4. The electronic equipment according to claim 1, wherein:
   the image display surface is substantially rectangular,
   the speakers are disposed at left and right locations of an upper side of the image display surface behind the image display surface, with the sound radiating surfaces of the speakers sloping up as viewed from the front, and
   the sound reflecting surface is disposed above the speakers so as to extend along the upper side of the image display surface in a left-right direction and slope down as viewed from the front.

5. The electronic equipment according to claim 1, wherein:
   the speakers are disposed on left and right sides of the image display surface behind the image display surface, with the sound radiating surfaces of the speakers opening outward as viewed from the front;
   at least one sound reflecting surface is disposed to the left of any speaker on the left of the image display surface, and at least one sound reflecting surface is disposed to the right of any speaker on the right of the image display surface;
   the sound reflecting surfaces extend along the left and right sides of the image display surface in an up-down direction and close inward as viewed from the front, respectively.

6. The electronic equipment according to claim 1, wherein the electronic equipment is a television apparatus.

7. Electronic equipment comprising:
   a cabinet
   an image display apparatus that is incorporated into the cabinet and disposed with an image display surface facing a front of the cabinet;
   a mounting plate provided at a location of the cabinet which is below a lower side of the image display surface, the mounting plate extending throughout the length of the lower side in a left-right direction and sloping down as viewed from the front, behind the image display surface;
   speakers that are disposed above left and right locations of the mounting plate, with the sound radiating surfaces of the speakers sloping down as viewed from the front, respectively;
   a reflector formed below the mounting plate so as to extend along the length of the mounting plate, and form a space, which is open toward the front of the cabinet, between the mounting plate and the reflector; and
   a sound reflecting surface that is formed on an upper surface of the reflector so as to extend along the length of the reflector and slope up as viewed from the front, for reflecting sounds radiated from the speakers through the space and the front of the cabinet.

8. The electronic equipment according to claim 7, wherein:
   a control panel is provided at a location of the mounting plate which is between the left and right speakers so as to be retractable toward the space, and
   the control panel includes control buttons for manipulating the electronic equipment.

9. The electronic equipment according to claim 7, wherein:
   a plurality of sound radiating holes are formed through the mounting plate where sound from each speaker is radiated.

10. The electronic equipment according to claim 9, wherein the sound radiating holes are formed into a grid pattern.

11. Electronic equipment comprising:
    a cabinet;
    an image display apparatus that is incorporated into the cabinet and disposed with an image display surface facing a front of the cabinet;
    a mounting plate provided at a location of the cabinet which is above an upper side of the image display surface, the mounting plate extending throughout the length of the upper side in a left-right direction and sloping up as viewed from the front, behind the image display surface;
    speakers that are disposed below left and right locations of the mounting plate, with the sound radiating surfaces of the speakers sloping up as viewed from the front, respectively;
    a reflector formed above the mounting plate so as to extend along the length of the mounting plate, and form a space, which is open toward the front of the cabinet, between the mounting plate and the reflector; and
    a sound reflecting surface that is formed on a lower surface of the reflector so as to extend along the length of the reflector and slope down as viewed from the front, for reflecting sounds radiated from the speakers through the space and the front of the cabinet.

12. The electronic equipment according to claim 11, wherein:
    a control panel is provided at a location of the mounting plate which is between the left and right speakers so as to be retractable toward the space, and
    the control panel includes control buttons for manipulating the electronic equipment.

13. The electronic equipment according to claim 11, wherein:
    a plurality of sound radiating holes are formed through the mounting plate where sound from each speaker is radiated.

14. Electronic equipment comprising:
a cabinet;
an image display apparatus that is incorporated into the cabinet and disposed with an image display surface facing a front of the cabinet;
mounting plates provided at locations of the cabinet which are outside left and right sides of the image display surface, the mounting plates extending along the length of the left and right sides in an up-down direction and opening outward as viewed from the front, behind the image display surface, respectively,
speakers that are disposed so as to face inner surfaces of the mounting plates, with the sound radiating surfaces of the speakers opening outward as viewed from the front, respectively,
a reflector formed outside each of the mounting plates so as to extend along the length of the mounting plate and form a space, which is open toward the front of the cabinet, between the mounting plate and the reflector; and
sound reflecting surfaces formed on surfaces of the reflectors facing the mounting plates so as to extend along the length of the reflectors and close inward as viewed from the front, respectively,
for reflecting sounds radiated from the speakers through the spaces and the front of the cabinet.

15. The electronic equipment according to claim 14, wherein:
a control panel is provided at a location of either one of the mounting plates so as to be retractable toward a corresponding one of the spaces, and
the control panel includes control buttons for manipulating the electronic equipment.

16. The electronic equipment according to claim 14, wherein:
a plurality of sound radiating holes are formed through the mounting plate where sound from each speaker is radiated.

* * * * *